United States Patent
Zhuang et al.

(10) Patent No.: US 10,068,343 B2
(45) Date of Patent: Sep. 4, 2018

(54) METHOD AND APPARATUS FOR RECOGNIZING MOVING TARGET

(71) Applicant: SHENZHEN HUABAO ELECTRONIC TECHNOLOGY CO., LTD., Shenzhen (CN)

(72) Inventors: Shaohua Zhuang, Shenzhen (CN); Wenming Chen, Shenzhen (CN); Changbei Jiang, Shenzhen (CN)

(73) Assignee: SHENZHEN HUABAO ELECTRONIC TECHNOLOGY CO., LTD., Shenzhen, Guangdong (CN)

( * ) Notice: Subject to any disclaimer, the term of this patent is extended or adjusted under 35 U.S.C. 154(b) by 46 days.

(21) Appl. No.: 15/120,989

(22) PCT Filed: Jul. 29, 2014

(86) PCT No.: PCT/CN2014/083257
§ 371 (c)(1),
(2) Date: Aug. 23, 2016

(87) PCT Pub. No.: WO2015/123967
PCT Pub. Date: Aug. 27, 2015

(65) Prior Publication Data
US 2016/0371827 A1 Dec. 22, 2016

(30) Foreign Application Priority Data
Feb. 24, 2014 (CN) .......................... 2014 1 0062447

(51) Int. Cl.
*G06K 9/00* (2006.01)
*G06T 7/20* (2017.01)
(Continued)

(52) U.S. Cl.
CPC ................ *G06T 7/20* (2013.01); *G06T 7/194* (2017.01); *G06T 7/215* (2017.01); *G06T 7/254* (2017.01);
(Continued)

(58) Field of Classification Search
CPC ............ G06T 2207/30252; G06T 2207/30232
See application file for complete search history.

(56) References Cited

U.S. PATENT DOCUMENTS

| 8,611,602 | B2 * | 12/2013 | Jin ........................... G06T 7/246 |
| | | | 382/103 |
| 8,798,357 | B2 * | 8/2014 | Sinha ................. G06K 9/00664 |
| | | | 345/419 |

(Continued)

FOREIGN PATENT DOCUMENTS

| CN | 102568005 | 7/2012 |
| CN | 103150738 | 6/2013 |
| CN | 103826102 | 5/2014 |

OTHER PUBLICATIONS

International Search Report of International Application No. PCT/CN2014/083257, dated Dec. 1, 2014, total 2 pages.

*Primary Examiner* — Oneal R Mistry
(74) *Attorney, Agent, or Firm* — Hamre, Schumann, Mueller & Larson, P.C.

(57) ABSTRACT

The present invention is applicable to the technical field of video monitoring. Provided are a method and an apparatus for recognizing a moving target. The method comprises: A: acquiring a video image with a background and a moving target; B: modeling a first video image to obtain a first background model; C: calculating a first differential image according to a second image and the first background model; D: modeling a second video image to obtain a second background model; E: calculating a second differential image according to a third image and the second background (Continued)

model; F: separately calculating a first binary image and a second binary image according to the first differential image and the second differential image; G: obtaining a variation region of the moving target according to the first binary image and the second binary image; and H: repeatedly performing steps A to G sequentially, and detecting variation regions of all moving targets. The present invention has good adaptability to a vehicle-mounted camera and has a high recognition rate of the moving target.

9 Claims, 2 Drawing Sheets

(51) Int. Cl.
  *G06T 7/254* (2017.01)
  *G06T 7/194* (2017.01)
  *G06T 7/215* (2017.01)
(52) U.S. Cl.
  CPC ............ *G06T 2207/10016* (2013.01); *G06T 2207/20224* (2013.01); *G06T 2207/30232* (2013.01); *G06T 2207/30252* (2013.01)

(56) References Cited

U.S. PATENT DOCUMENTS

| | | | |
|---|---|---|---|
| 2001/0046309 A1* | 11/2001 | Kamei | ............... G06T 7/215 382/103 |
| 2012/0051593 A1 | 3/2012 | Tojo | |
| 2017/0124418 A1* | 5/2017 | Besiris | ................ G06K 9/4604 |

* cited by examiner

METHOD AND APPARATUS FOR RECOGNIZING MOVING TARGET

FIELD OF THE INVENTION

The present invention relates to the technical field of video monitoring, and more particularly to a method and device for recognizing a moving target.

BACKGROUND OF THE INVENTION

Video monitoring is an important application of computer vision, and is widely used in many sites such as residential areas, office buildings, traffic transportation, and so on, and has become an important means for security protection monitoring in many fields such as residential areas, transportation, business and even national defence.

Commonly used methods for motion detection include a background deduction method, a frame difference method, an optical flow method, etc. These methods generally take a static background or a quasi static background as a condition, and are adapted to sites where moving speeds of vehicles are low and a requirement for the accuracy of image segmentation is not high. However, in the event that the background is a dynamic background or a complicated background, using these methods to implement the motion detection is weak in instantaneity, very sensitive to external environmental changes, and has a bad noise-resistance performance; when video images are seriously contaminated by noises, a greater error probability may be caused.

Technical Problems

The embodiments of the present invention provide a method and apparatus for recognizing a moving target, which aim at solving a problem that a method for detecting a moving target provided by the prior art has a great error probability.

Technical Solution

In one aspect, the present invention provides a method for recognizing a moving target, the method comprises:

step A, collecting video images that contain backgrounds and moving targets;

step B, modeling a first frame of the video images and obtaining a first background model;

step C, calculating and obtaining a first differential image according to a second frame of the video images and the first background model;

step D, modeling the second frame of the video images and obtaining a second background model;

step E, calculating and obtaining a second differential image according to a third frame of the video images and the second background model;

step F, calculating and obtaining a first binary image and a second binary image respectively according to the first differential image and the second differential image;

step G, obtaining a variation region of the moving target according to the first binary image and the second binary image; and step H, sequentially and repeatedly performing the steps A-G and detecting variation regions of all moving targets.

Further, after the step G, the method further comprises:

performing a two-dimensional cross entropy threshold division process based on spatial neighborhood information for the variation region of the moving target, and using a macro block with a preset size as a unit to judge whether there exists a moving target in the variation region of the moving target.

Furthermore, using a macro block with a preset size as a unit to judge whether there exists a moving target in the variation region of the moving target comprises:

dividing variation regions of all moving targets by the macro block with the preset size, and counting the total number N1 of used macro blocks;

detecting the N1 macro blocks one by one; wherein, if a total number of pixels of the moving target contained in a detected macro block exceeds a preset pixel number, the detected macro block is counted by one time; and counting a number N2 of counted macro blocks;

when N2/N1 exceeds a preset value, judging that there exists a moving target in the variation region of the moving target.

Furthermore, the method further comprises:

using an improved gaussian mixture model to model the first frame of the video images and obtaining the first background model; and using the improved gaussian mixture model to model the second frame of the video images and obtaining the second background model.

Furthermore, the method further comprises:

using an inter-frame difference method to calculate and obtain the first differential image according to the second frame of the video images and the first background model; and using the inter-frame difference method to calculate and obtain the second differential image according to the third frame of the video images and the second background model.

In another aspect, the method provides an apparatus for recognizing a moving target, the apparatus comprises:

a video image collecting unit configured for collecting video images that contain backgrounds and moving targets;

a first background model obtaining unit configured for modeling a first frame of the video images and obtaining a first background model;

a first differential image obtaining unit configured for calculating and obtaining a first differential image according to a second frame of the video images and the first background model;

a second background model obtaining unit configured for modeling the second frame of the video images and obtaining a second background model;

a second differential image obtaining unit configured for calculating and obtaining a second differential image according to a third frame of the video images and the second background model;

a binary image obtaining unit configured for calculating and obtaining a first binary image and a second binary image respectively according to the first differential image and the second differential image; and a variation region obtaining unit configured for obtaining a variation region of the moving target according to the first binary image and the second binary image.

Further, the apparatus further comprises:

a moving target recognizing unit configured for performing a two-dimensional cross entropy threshold division process based on spacial neighborhood information for the variation region of the moving target, and using a macro block with a preset size as an unit to judge whether there exists a moving target in the variation region of the moving target.

Furthermore, the moving target recognizing unit comprises:

a macro block total number counting module configured for dividing variation regions of all moving targets by the macro block with the preset size, and counting the total number N1 of used macro blocks;

a macro block detecting module configured for detecting for the N1 macro blocks one by one; wherein, if a total number of pixels of the moving target contained in a detected macro block exceeds a preset pixel number, the detected macro block is counted by one time;

a macro block number counting module configured for counting a number N2 of the counted macro blocks; and a moving target judging module configured for judging that there exists a moving target in the variation region of the moving target when N2/N1 exceeds a preset value.

Furthermore, the first background model obtaining unit is configured for using an improved gaussian mixture model to model the first frame of the video images and obtaining the first background model; and the second background model obtaining unit is configured for using the improved gaussian mixture model to model the second frame of the video images and obtaining the second background model.

Furthermore, the first differential image obtaining unit is configured for using an inter-frame difference method to calculate and obtain the first differential image according to the second frame of the video images and the first background model; and the second differential image obtaining unit is configured for using the inter-frame difference method to calculate and obtain the second differential image according to the third frame of the video images and the second background model.

Advantageous Effects of the Present Invention

In the embodiments of the present invention, during a moving process of a vehicle, background models are firstly established and updated continuously according to video frame images collected in real time, and then a variation region of a moving target is calculated according to the updated background models and the video frames collected in real time. The present invention has a good self-adaptability to a vehicle-mounted moving camera and has a high recognition rate for moving targets.

DETAILED DESCRIPTION OF THE PREFERRED EMBODIMENTS

In order to make the purposes, technical solutions, and advantages of the present invention be clearer and more understandable, the present invention will be further described in detail hereafter with reference to the accompanying drawings and embodiments. It should be understood that the embodiments described herein are only intended to illustrate but not to limit the present invention.

In the embodiments of the present invention, video images that contain backgrounds and moving targets are collected; a first frame of the video images is modeled and a first background model is obtained; a first differential image is calculated and obtained according to a second frame of the video images and the first background model; the second frame of the video images is modeled and a second background model is obtained; a second differential image is calculated and obtained according to a third frame of the video images and the second background model; a first binary image and a second binary image are calculated and obtained according to the first differential image and the second differential image respectively; a variation region of a moving target is obtained according to the first binary image and the second binary image; the aforesaid steps are executed repeatedly and sequentially, and variation regions of all moving targets are detected.

An implementation of the present invention is described in detail hereinafter in combination with specified embodiments:

Embodiment I

Figure 1:
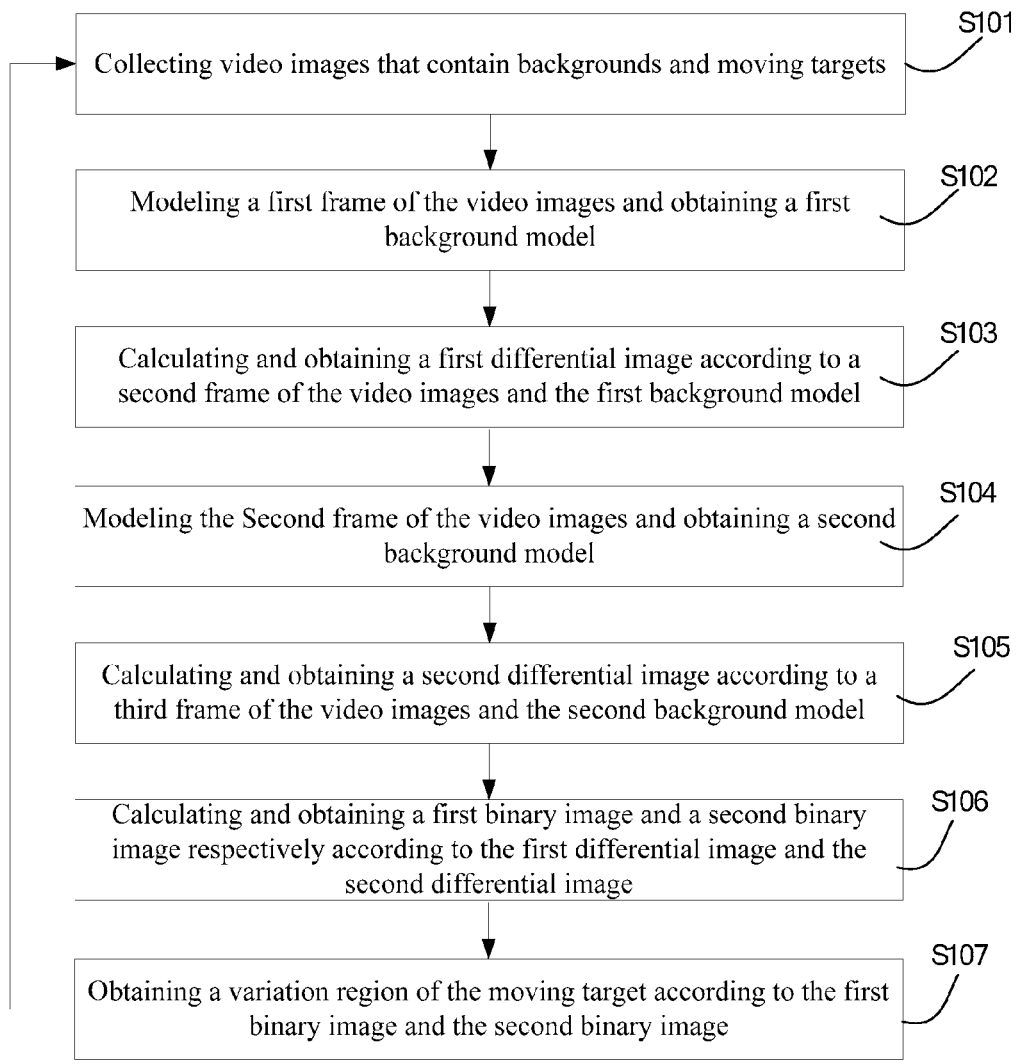
FIG. 1 is an implementation flow chart of a method for recognizing a moving target provided by a first embodiment of the present invention.

FIG. 1 illustrates an implementation flow chart of a method for recognizing a moving target provided by a first embodiment of the present invention, which is described in detail as follows:

In a step S101, collecting video images that contain backgrounds and moving targets.

In this embodiment, a vehicle-mounted video surveillance camera is used to collect the video images containing backgrounds and moving targets.

In a step S102, modeling a first frame of the video images and obtaining a first background model.

In this embodiment, the first frame of the video images collected in the step S101 is used as an initial background image, pixels of the initial background image is modeled using a gaussian mixture model, and the first background model is obtained.

Of course, the pixels of the initial background image can be modeled using an improved gaussian mixture model, and thus the first background model is obtained.

Specifically, in this embodiment, the pixels of the initial background image can also be modeled by other modeling methods, such as a mid-value method background modeling, an average value method background modeling, a kalman filtering background modeling, an advanced background modeling, and so on, thereby obtaining the first background model. A specific modeling method to be used is not limited herein, but it is preferred that the gaussian mixture modeling is adopted to model the pixels of the initial background image.

In a step S103, calculating and obtaining a first differential image according to the second frame of the video images and the first background model.

In this embodiment, after the second frame of the video images and the first background model are grayed respectively, the grayed second frame of the video images and the grayed first background model are further processed by an inter-frame difference method respectively, and the first differential image is obtained.

In a step S104, modeling the second frame of the video images and obtaining a second background model.

In this embodiment, pixels of the second frame of the video images collected in the step S101 are modeled using the gaussian mixture model, so that the second background model can be obtained.

Of course, the pixels of the second frame of the video images can also be modeled by the improved gaussian mixture model, so that the second background model can be obtained.

In a step S105, calculating and obtaining a second differential image according to a third frame of the video images and the second background model.

In this embodiment, after the third frame of the video images collected in the step S101 and the second background model obtained in the step S104 are grayed respectively, the grayed third frame of the video images and the grayed second background model are processed by the inter-frame difference method, and thus the second differential image is obtained.

In a step S106, calculating and obtaining a first binary image and a second binary image respectively according to the first differential image and the second differential image.

In this embodiment, the first differential image obtained in the step S103 and the second differential image obtained in the step S105 are obtained are binarized respectively, and thus the first binary image and the second binary image can be obtained respectively.

In a step S107, calculating and obtaining a variation region of a moving target according to the first binary image and the second binary image.

In this embodiment, in each of the pixels, a logic AND calculation for the first binary image and the second binary image obtained in the step S106 is performed, and thus the variation region of the moving target can be calculated. Based on a gray value of the variation region of the moving target, a gray detecting threshold is set, so that the moving target in the video images can be accurately recognized.

After the step S107 has been executed, the steps S101-S107 can be performed sequentially and repeatedly, such that variation regions of all moving targets are detected.

As a preferred embodiment of the present invention, after the step S107, the method further comprises:

performing a two-dimensional cross entropy threshold division process based on spatial neighborhood information for the variation region of the moving target, and using a macro block with a preset size as a unit to judge whether there exists the moving target in the variation region of the moving target. Wherein, performing the two-dimensional cross entropy threshold division process based on spatial neighborhood information for the variation region of the moving target can not only eliminate disturbances of noise pixels as much as possible, but also extract pixels being relevant to the moving target at the largest extent, thereby achieving a more accurate judgment for the variation region of the moving target.

Wherein, in this embodiment, the variation region of the moving target is divided into a plurality of image blocks with the same size, each of the image blocks has a size of 16×16 pixels, that is, the macro block has a size of 16×16 pixels.

In a specific implementation, if a size of each of divided small regions exceeds 16×8 pixels, each of the small regions is considered as an image block.

Specifically, variation regions of all moving targets are divided by the macro block with the size of 16×16 pixels, and a total number N1 of used macro blocks are counted; afterwards, the N1 macro blocks are analyzed and judged one by one, if a total number of pixels of a moving target contained in a macro block exceeds a preset number of pixels, such as 128 (that is, a half of the number of the pixels in the macro block), the macro block is counted by one time; thus, a total number N2 of the counted macro blocks are counted; finally, a value of N2/N1 is judged, when N2/N1 exceeds a preset value (e.g., ¼ or ⅓ or ½), it is judged that there exists a moving target in the variation region of the moving target. Wherein, "N2/N1" represents that "N1 is divided by N2".

In this embodiment, in a moving process of a vehicle, background models are continuously established and updated according to video frame images collected in real time, and then variation regions of the moving target are calculated according to the updated background models and the video frame images collected in real time. The present invention has an excellent adaptability to a vehicle-mounted movable camera, and has a high recognition rate for moving targets. In addition, the video images are processed by a method combining the inter-frame difference method with the two-dimensional cross entropy threshold value dividing method, thereby improving a probability of accurately judging the moving target and a noise-resistance performance.

It can be understood for the one of ordinary skill in the art that all of or some steps of each of the methods in the aforesaid embodiments can be accomplished by using programs to instruct relevant hardware, and the corresponding programs can be stored in a computer readable storage medium, the computer readable storage medium can be, for example, ROM (Read Only Memory)/RAM (Random Access Memory), disks, and so on.

Embodiment II

Figure 2:
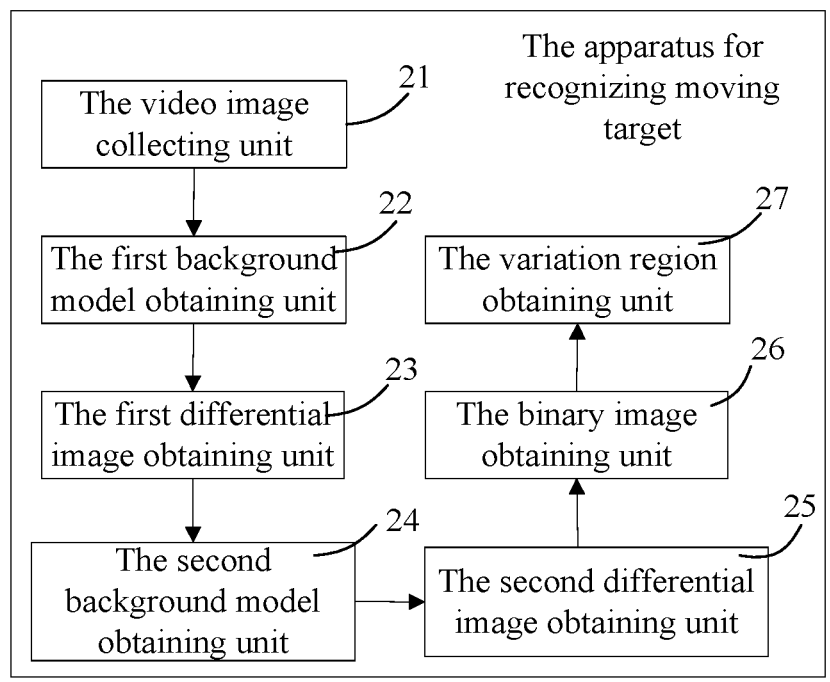
FIG. 2 is a structural block diagram of an apparatus for recognizing a moving target provided by a second embodiment of the present invention.

FIG. 2 illustrates a specific structural block diagram of an apparatus 2 for recognizing a moving target provided by a second embodiment of the present invention. For convenient description, only the part that is relevant with the embodiment of the present invention is illustrated. The apparatus 2 for recognizing the moving target comprises: a video image collecting unit 21, a first background model obtaining unit 22, a first differential image obtaining unit 23, a second background model obtaining unit 24, a second differential image obtaining unit 25, a binary image obtaining unit 26, and a variation region obtaining unit 27.

Wherein, the video image collecting unit 21 is configured for collecting video images that contain backgrounds and moving targets;

the first background model obtaining unit 22 is configured for modeling a first frame of the video images and obtaining a first background model;

the first differential image obtaining unit 23 is configured for calculating and obtaining a first differential image according to a second frame of the video images and the first background model;

a second background model obtaining unit 24 is configured for modeling the second frame of the video images and obtaining a second background model;

a second differential image obtaining unit 25 is configured for calculating and obtaining a second differential image according to a third frame of the video images and the second background model;

the binary image obtaining unit 26 is configured for calculating and obtaining a first binary image and a second binary image respectively according to the first differential image and the second differential image; and the variation region obtaining unit 27 is configured for obtaining a variation region of the moving target according to the first binary image and the second binary image.

Further, the apparatus 2 further comprises:

a moving target recognizing unit configured for performing a two-dimensional cross entropy threshold division process based on spacial neighborhood information for the variation region of the moving target, and using a macro block with a preset size as an unit to judge whether there exists a moving target in the variation region of the moving target.

Specifically, the moving target recognizing unit comprises:

a macro block total number counting module configured for dividing variation regions of all moving targets by the macro block with the preset size, and counting a total number N1 of used macro blocks;

a macro block detecting module configured for detecting for the N1 macro blocks one by one; wherein, if a total number of pixels of the moving target contained in a detected macro block exceeds a preset pixel number, the detected macro block is counted by one time;

a macro block number counting module configured for counting a number N2 of the counted macro blocks;

a moving target judging module configured for judging that there exists a moving target in the variation region of the moving target when N2/N1 exceeds a preset value.

Furthermore, the first background model obtaining unit is configured for using an improved gaussian mixture model to model the first frame of the video images and obtaining the first background model;

the second background model obtaining unit is configured for using the improved gaussian mixture model to model the second frame of the video images and obtaining the second background model.

Furthermore, the first differential image obtaining unit is configured for using an inter-frame difference method to calculate and obtain the first differential image according to the second frame of the video images and the first background model;

the second differential image obtaining unit is configured for using the inter-frame difference method to calculate and obtain the second differential image according to the third frame of the video images and the second background model.

The apparatus for recognizing the moving target provided by the embodiment of the present invention can be applied in the aforesaid corresponding method embodiment, for details, please refer to the description in the aforesaid embodiment I, it is not repeatedly described here.

It should be noted that, each of the units included in the aforesaid apparatus embodiment are divided by logic function merely, and should not be limited by the aforesaid dividing method as long as corresponding functions can be implemented; in addition, a specific name of each of functional units intends to distinguish from each other conveniently but not to be configured to limit the protection scope of the present invention.

The aforementioned embodiments are only preferred embodiments of the present invention, and should not be regarded as being limitation to the present invention. Any modification, equivalent replacement, improvement, and so on, which are made within the spirit and the principle of the present invention, should be included within the protection scope of the present invention.

The invention claimed is:

1. A method for recognizing a moving target in an apparatus for recognizing a moving target, comprising:
   step A, collecting video images that contain backgrounds and moving targets;
   step B, modeling a first frame of the video images and obtaining a first background model;
   step C, calculating and obtaining a first differential image according to a second frame of the video images and the first background model;
   step D, modeling the second frame of the video images and obtaining a second background model;
   step E, calculating and obtaining a second differential image according to a third frame of the video images and the second background model;
   step F, calculating and obtaining a first binary image and a second binary image respectively according to the first differential image and the second differential image;
   step G, obtaining a variation region of the moving target according to the first binary image and the second binary image; and
   step H, sequentially and repeatedly performing the steps A-G and detecting variation regions of all moving targets;
   wherein after the step G, the method further comprises:
   performing a two-dimensional cross entropy threshold division process based on spacial neighborhood information for the variation region of the moving target, and using image blocks with the same size to judge whether there exists a moving target in the variation region of the moving target, wherein each of the image blocks is a divided small region with a size that exceeds a preset pixel size;
   wherein a step of using image blocks with the same size to judge whether there exists a moving target in the variation region of the moving target particularly comprises:
   dividing variation regions of all moving targets by the image blocks with the preset image size, counting the total number of image blocks that are used to divide the variation regions of moving targets, wherein the total number of image blocks that are used to divide the variation regions of moving targets is defined as N1;
   detecting the image blocks with the number of N1 one by one; wherein, if a pixel number of the moving target contained in one of the image blocks exceeds a preset pixel number, the image block is counted once;
   counting a number of the image blocks which has the pixel number that exceeds the preset pixel number, wherein the number of the image blocks which has the pixel number that exceeds the preset pixel number is defined as N2; and
   dividing N2 by N1, and judging that there exists a moving target in the variation region of the moving target when a division result exceeds a preset value.

2. The method according to claim 1, further comprising:
   using an improved gaussian mixture model to model the first frame of the video images, and obtaining the first background model; and
   using the improved gaussian mixture model to model the second frame of the video images, and obtaining the second background model.

3. The method according to claim 1, further comprising:
   using an inter-frame difference method to calculate and obtain the first differential image according to the second frame of the video images and the first background model; and
   using the inter-frame difference method to calculate and obtain the second differential image according to the third frame of the video images and the second background model.

4. The method according to claim 1, wherein calculating and obtaining a first differential image according to a second frame of the video images and the first background model particularly comprises:
graying the second frame of the video images and the first background model; and
further processing the grayed second frame of the video images and the first background model by an inter-frame difference method so as to obtain the first differential image.

5. The method according to claim 1, wherein calculating and obtaining a second differential image according to a third frame of the video images and the second background model particularly comprises:
graying the third frame of the video images and the second background model; and
further processing the grayed third frame of the video images and the second background model by an inter-frame difference method so as to obtain the second differential image.

6. The method according to claim 1, wherein obtaining a variation region of the moving target according to the first binary image and the second binary image further comprises:
setting a gray detection threshold based on a gray value of the variation of the moving target; and
recognizing the moving target in the video images according to the gray detection threshold.

7. An apparatus for recognizing a moving target, comprising a processor and a storage medium which stores computer program in the form of software units/modules and executable by the processor, wherein the software units/modules comprise:
a video image collecting unit configured to collect video images that contain backgrounds and moving targets;
a first background model obtaining unit configured to model a first frame of the video images and obtain a first background model;
a first differential image obtaining unit configured to calculate and obtain a first differential image according to a second frame of the video images and the first background model;
a second background model obtaining unit configured to model the second frame of the video images and obtain a second background model;
a second differential image obtaining unit configured to calculate and obtain a second differential image according to a third frame of the video images and the second background model;
a binary image obtaining unit configured to calculate and obtain a first binary image and a second binary image respectively according to the first differential image and the second differential image; and
a variation region obtaining unit configured to obtain a variation region of the moving target according to the first binary image and the second binary image;
wherein the apparatus further comprises:
a moving target recognizing unit configured to perform a two-dimensional cross entropy threshold division process based on spacial neighborhood information for the variation region of the moving target, and use an image block with a same size to judge whether there exists a moving target in the variation region of the moving target;
an image block total number counting module configured to divide variation regions of all moving targets by the image blocks with the preset image size, and count the total number of image blocks that are used to divide the variation regions of moving targets, wherein the total number of image blocks that are used to divide the variation regions of moving targets is defined as N1;
an image block detecting module configured to detect the image blocks with the number of N1 one by one; wherein, if a pixel number of the moving target contained in one of the image blocks exceeds a preset pixel number, the image block is counted once;
an image block number counting module configured to count a number of the image blocks which has the pixel number that exceeds the preset pixel number, wherein the number of the image blocks which has the pixel number that exceeds the preset pixel number is defined as N2; and
a moving target judging module configured to divide N2 by N1, and judge that there exists a moving target in the variation region of the moving target when a division result exceeds a preset value.

8. The apparatus according to claim 7, wherein:
the first background model obtaining unit is configured to use an improved gaussian mixture model to model the first frame of the video images and obtaining the first background model; and
the second background model obtaining unit is configured to use the improved gaussian mixture model to model the second frame of the video images and obtaining the second background model.

9. The apparatus according to claim 7, wherein:
the first differential image obtaining unit is configured to use an inter-frame difference method to calculate and obtain the first differential image according to the second frame of the video images and the first background model; and
the second differential image obtaining unit is configured to use the inter-frame difference method to calculate and obtain the second differential image according to the third frame of the video images and the second background model.

* * * * *